(12) United States Patent
Koike et al.

(10) Patent No.: US 11,560,019 B2
(45) Date of Patent: Jan. 24, 2023

(54) TIRE

(71) Applicant: SUMITOMO RUBBER INDUSTRIES, LTD., Hyogo (JP)

(72) Inventors: Hiroki Koike, Hyogo (JP); Yoshifumi Kawagoe, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 191 days.

(21) Appl. No.: 17/094,144

(22) Filed: Nov. 10, 2020

(65) Prior Publication Data

US 2021/0155049 A1 May 27, 2021

(30) Foreign Application Priority Data

Nov. 22, 2019 (JP) .............................. JP2019-211485

(51) Int. Cl.
*B60C 11/03* (2006.01)

(52) U.S. Cl.
CPC ..................... *B60C 11/0304* (2013.01); *B60C 2011/0339* (2013.01)

(58) Field of Classification Search
CPC ............ B60C 2011/0348; B60C 11/03; B60C 2011/0339; B60C 11/0304
See application file for complete search history.

(56) References Cited

U.S. PATENT DOCUMENTS 5,996,661 A * 12/1999 Gerresheim ........ B60C 11/0302
152/209.28
2017/0282651 A1 * 10/2017 Suzuki ..................... B60C 11/13
2018/0201071 A1    7/2018 Mishima et al.

FOREIGN PATENT DOCUMENTS

JP        2018-114846        7/2018

* cited by examiner

*Primary Examiner* — Cedrick S Williams
(74) *Attorney, Agent, or Firm* — Greenblum & Bernstein, P.L.C.

(57) ABSTRACT

A tire has a tread portion including a first land portion including first and second circumferential edges and and a tread surface. On the first land portion, curved grooves are provided in a tire circumferential direction. Each curved groove extends from a first end on the first circumferential edge side, terminates at a second end within the first land portion, and includes first and second curved portions and on the first end and second end sides, respectively. The first curved portion is an arc curve with a radius of curvature having a center on the first circumferential edge side of the curved groove. The second curved portion is an arc curve with a radius of curvature having a center on the second circumferential edge side of the curved groove.

19 Claims, 13 Drawing Sheets

TIRE

BACKGROUND OF THE INVENTION

Field of the Invention

The present invention relates to a tire.

Description of the Background Art

Japanese Laid-Open Patent Publication No. 2018-114846 discloses a tire having improved running performance on a dry road surface and an ice and snow road surface by improving the arrangement of grooves.

In recent years, with enhancement of the performance of vehicles, tires that exhibit more excellent on-snow performance have been required. Meanwhile, depending on the shapes of grooves, steering stability on a dry road surface may be deteriorated with improvement of on-snow performance.

The present invention has been made in view of the above-described problem, and a main object of the present invention is to provide a tire that can exhibit excellent on-snow performance while maintaining steering stability on a dry road surface.

SUMMARY OF THE INVENTION

The present invention is directed to a tire having a tread portion, wherein: the tread portion includes a first land portion; the first land portion includes a first circumferential edge, a second circumferential edge, and a tread surface between the first circumferential edge and the second circumferential edge; on the first land portion, a plurality of curved grooves are provided in a tire circumferential direction; each of the curved grooves extends from a first end on the first circumferential edge side and terminates at a second end within the first land portion; each of the curved grooves includes a first curved portion on the first end side, and a second curved portion on the second end side; the first curved portion is an arc curve with a radius of curvature having a center on the first circumferential edge side of the curved groove; and the second curved portion is an arc curve with a radius of curvature having a center on the second circumferential edge side of the curved groove.

In the tire according to the present invention, the first curved portion preferably crosses a center position in a tire axial direction of the first land portion.

In the tire according to the present invention, the second curved portion preferably crosses the center position in the tire axial direction of the first land portion.

In the tire according to the present invention, the second end is preferably located between the first circumferential edge and the center position in the tire axial direction of the first land portion.

In the tire according to the present invention, a groove width of each of the curved grooves preferably gradually decreases from the first end toward the second end.

In the tire according to the present invention, the groove width of each of the curved grooves is preferably 2 to 4 mm.

In the tire according to the present invention, the radius of curvature of the second curved portion is preferably larger than the radius of curvature of the first curved portion.

In the tire according to the present invention, the radius of curvature of the first curved portion is preferably 10 to 30 mm.

In the tire according to the present invention, the radius of curvature of the second curved portion is preferably 30 to 60 mm.

In the tire according to the present invention, a length in the tire circumferential direction of the first curved portion is preferably 30% to 70% of a length in the tire circumferential direction of the curved groove.

In the tire according to the present invention, the tread portion preferably includes four land portions demarcated by main grooves continuous in the tire circumferential direction.

In the tire according to the present invention, preferably, the tire has a designated mounting direction to a vehicle, the tread portion includes a first tread edge located on an outer side of the vehicle when the tire is mounted on the vehicle, a second tread edge located on an inner side of the vehicle when the tire is mounted on the vehicle, a first shoulder main groove continuously extending in the tire circumferential direction between the first tread edge and a tire equator, and a crown main groove adjacent to the second tread edge side of the first shoulder main groove, and the first land portion is demarcated between the first shoulder main groove and the crown main groove.

On the first land portion of the tire according to the present invention, a plurality of curved grooves are provided in the tire circumferential direction. Each curved groove extends from a first end on the first circumferential edge side of the first land portion and terminates at a second end within the first land portion. Such a curved groove serves to inhibit an excessive reduction in the stiffness of the first land portion and maintain steering stability on a dry road surface.

Each curved groove includes a first curved portion on the first end side, and a second curved portion on the second end side. The first curved portion is an arc curve with a radius of curvature having a center on the first circumferential edge side of the curved groove, and the second curved portion is an arc curve with a radius of curvature having a center on the second circumferential edge side of the curved groove. The edges of the first curved portion and the second curved portion of such a curved groove can provide frictional force in multiple directions during cornering on a strongly compacted snow road and enhance on-snow performance.

DESCRIPTION OF THE PREFERRED EMBODIMENTS

Figure 1:
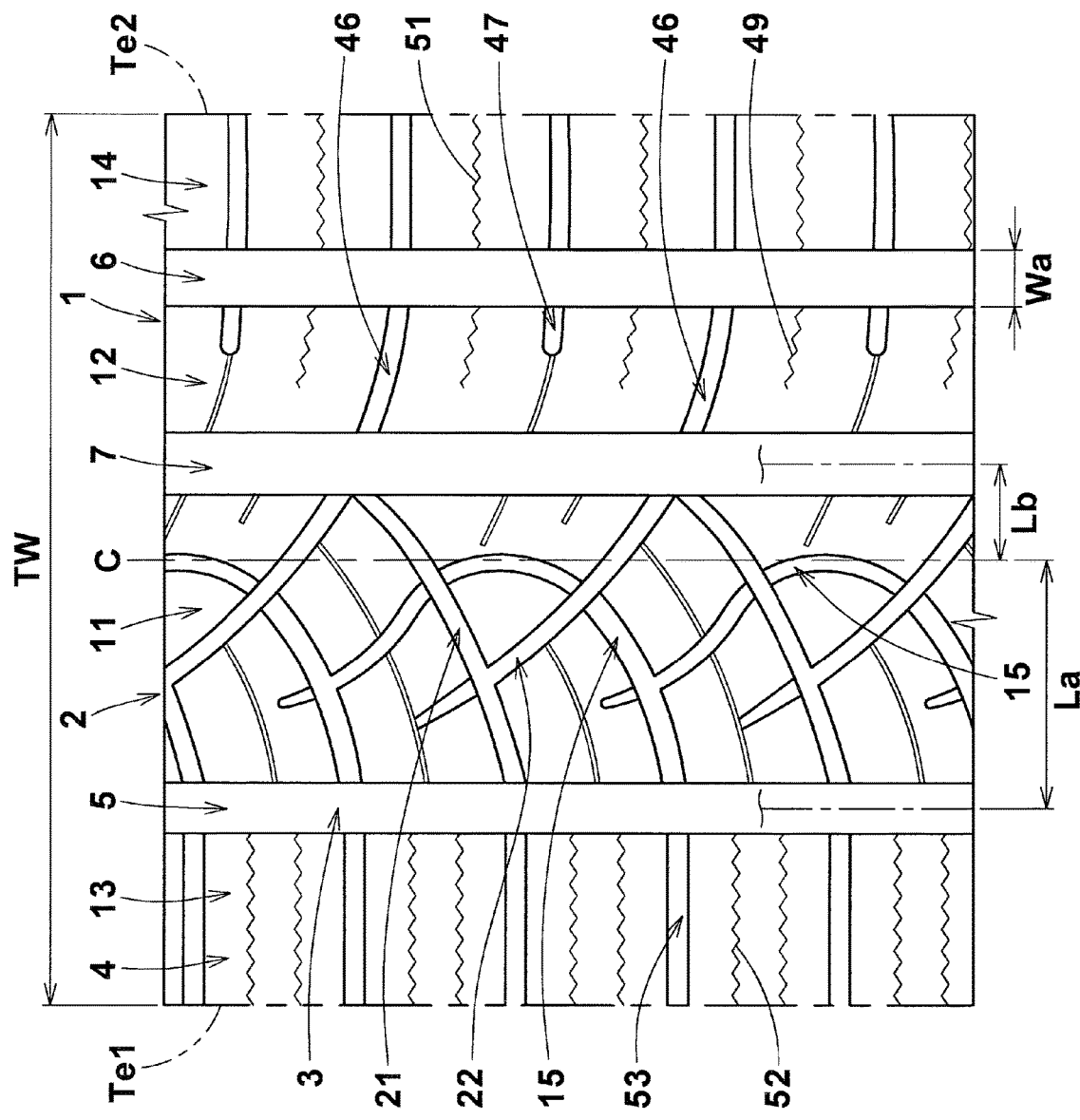
FIG. 1 is a development of a tread portion of a tire according to an embodiment of the present invention.

Hereinafter, an embodiment of the present invention will be described with reference to the drawings. FIG. 1 is a development of a tread portion 2 of a tire 1 showing the embodiment of the present invention. The tire 1 according to the present embodiment is suitably used, for example, as a pneumatic tire for a passenger car. However, the present invention is not limited to such a mode, and may be applied to a heavy-duty pneumatic tire and a non-pneumatic tire the interior of which is not filled with pressurized air.

As shown in FIG. 1, the tire 1 according to the present embodiment has the tread portion 2 having a designated mounting direction to a vehicle. The tread portion 2 has a first tread edge Te1 located at the outer side of a vehicle when the tire 1 is mounted on the vehicle, and a second tread edge Te2 located at the inner side of the vehicle when the tire 1 is mounted on the vehicle. The mounting direction to a vehicle is indicated, for example, on a sidewall portion (not shown) by characters or symbols.

In the case of a pneumatic tire, each of the first tread edge Te1 and the second tread edge Te2 is a ground contact position at the outermost side in the tire axial direction when a normal load is applied to the tire 1 in a normal state and the tire 1 is brought into contact with a flat surface at a camber angle of 0°. The normal state is a state where the tire is mounted to a normal rim and inflated to a normal internal pressure and no load is applied to the tire. In the present description, unless otherwise specified, dimensions and the like of components of the tire are values measured in the normal state.

The "normal rim" is a rim that is defined, in a standard system including a standard on which the tire is based, by the standard for each tire, and is, for example, the "standard rim" in the JATMA standard, the "Design Rim" in the TRA standard, or the "Measuring Rim" in the ETRTO standard.

The "normal internal pressure" is an air pressure that is defined, in a standard system including a standard on which the tire is based, by the standard for each tire, and is the "maximum air pressure" in the JATMA standard, the maximum value indicated in the table "TIRE LOAD LIMITS AT VARIOUS COLD INFLATION PRESSURES" in the TRA standard, or the "INFLATION PRESSURE" in the ETRTO standard.

The "normal load" is a load that is defined, in a standard system including a standard on which the tire is based, by the standard for each tire, and is the "maximum load capacity" in the JATMA standard, the maximum value indicated in the table "TIRE LOAD LIMITS AT VARIOUS COLD INFLATION PRESSURES" in the TRA standard, or the "LOAD CAPACITY" in the ETRTO standard.

The tread portion 2 includes a plurality of main grooves 3 continuously extending in the tire circumferential direction between the first tread edge Te1 and the second tread edge Te2, and a plurality of land portions 4 demarcated by these main grooves 3. The tread portion 2 of the present embodiment includes three main grooves 3 and four land portions 4. However, the tire according to the present invention is not limited to such a mode.

The main grooves 3 include a first shoulder main groove 5 provided between the first tread edge Te1 and a tire equator C, a second shoulder main groove 6 provided between the second tread edge Te2 and the tire equator C, and a crown main groove 7 provided between the first shoulder main groove 5 and the second shoulder main groove 6.

The distance La in the tire axial direction from the tire equator C to the groove center line of the first shoulder main groove 5 or the second shoulder main groove 6 is, for example, preferably 0.20 to 0.35 times a tread width TW. The distance Lb in the tire axial direction from the tire equator C to the groove center line of the crown main groove 7 is, for example, preferably not greater than 0.15 times the tread width TW. The tread width TW is the distance in the tire axial direction from the first tread edge Te1 to the second tread edge Te2 in the normal state.

The crown main groove 7 of the present embodiment is provided, for example, on the second tread edge Te2 side with respect to the tire equator C. However, the position of the crown main groove 7 is not limited to such a position.

Each main groove 3 of the present embodiment extends, for example, in a straight manner so as to be parallel to the tire circumferential direction. Each main groove 3 may extend, for example, in a wavy manner.

The groove width Wa of each main groove 3 is, for example, preferably 5.0% to 8.0% of the tread width TW. In the present specification, the groove width is the distance between the groove edges in a direction orthogonal to the groove center line. In a preferable mode, the groove width of the second shoulder main groove 6 is larger than the groove width of the first shoulder main groove 5, and the groove width of the crown main groove 7 is larger than the groove width of the second shoulder main groove 6. In the case of a pneumatic tire for a passenger car, the depth of each main groove 3 is, for example, preferably 5 to 10 mm.

The land portions 4 include a first land portion 11, a second land portion 12, a third land portion 13, and a fourth land portion 14. The first land portion 11 is demarcated between the first shoulder main groove 5 and the crown main groove 7. The second land portion 12 is demarcated between the second shoulder main groove 6 and the crown main groove 7. The third land portion 13 is demarcated between the first shoulder main groove 5 and the first tread edge Te1. The fourth land portion 14 is demarcated between the second shoulder main groove 6 and the second tread edge Te2.

Figure 2:
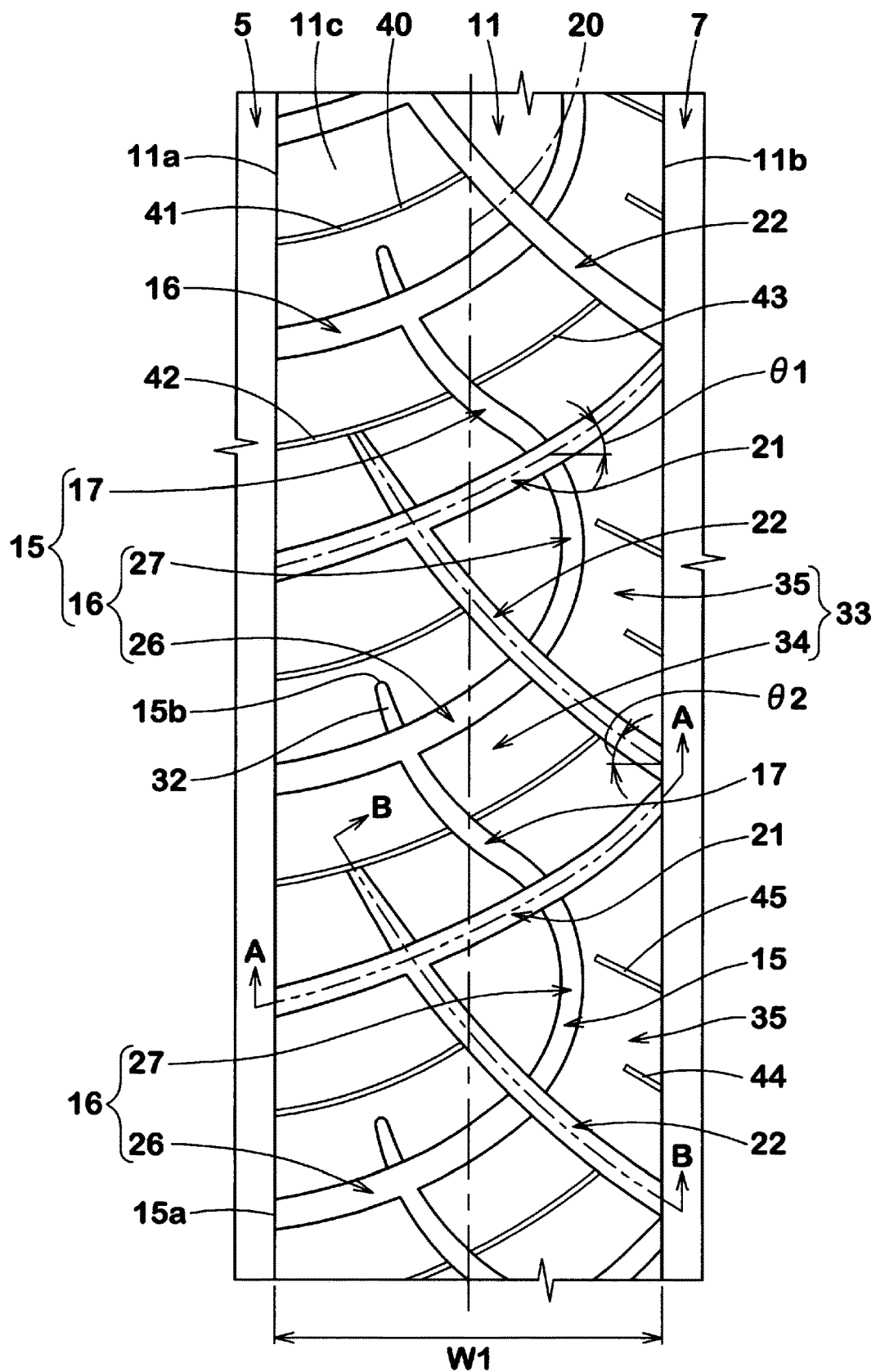
FIG. 2 is an enlarged view of a first land portion in FIG. 1.

FIG. 2 shows an enlarged view of the first land portion 11. As shown in FIG. 2, the first land portion 11 of the present embodiment has a largest width W1 in the tire axial direction among the four land portions 4. In the tread portion 2 which includes the four land portions 4, a great contact pressure acts on the first land portion 11 during straight running and during cornering, but, in the present embodiment, the first land portion 11 has the largest width in the tire axial direction among the four land portions 4 and has high stiffness. Therefore, steering stability on a dry road surface is improved. The width W1 of the first land portion 11 is, for example, preferably 0.25 to 0.40 times of the tread width TW (shown in FIG. 1, and the same applies below).

The first land portion 11 includes a first circumferential edge 11a, a second circumferential edge 11b, and a tread surface 11c between the first circumferential edge 11a and the second circumferential edge 11b. The first circumferential edge 11a is the circumferential edge on the first shoulder main groove 5 side of the first land portion 11, and the second circumferential edge 11b is the circumferential edge on the crown main groove 7 side of the first land portion 11.

On the first land portion 11, a plurality of curved grooves 15 are provided in the tire circumferential direction. Each curved groove 15 extends from a first end 15a on the first circumferential edge 11a side and terminates at a second end 15b within the first land portion 11. Such a curved groove 15 serves to inhibit an excessive reduction in the stiffness of the first land portion 11 and maintain steering stability on a dry road surface.

The curved groove 15 includes a first curved portion 16 on the first end 15a side, and a second curved portion 17 on the second end 15b side. The first curved portion 16 is an arc curve with a radius of curvature having a center on the first curved edge 11a side of the curved groove 15. The second curved portion 17 is an arc curve with a radius of curvature having a center on the second circumferential edge 11b side of the curved groove 15. The edges of the first curved portion 16 and the second curved portion 17 of such a curved groove 15 can provide frictional force in multiple directions during cornering on a strongly compacted snow road and enhance on-snow performance.

Hereinafter, the specific configuration of the tire according to the present embodiment will be described. The first land portion 11 of the present embodiment has, for example, a plurality of first inclined grooves 21 and a plurality of second inclined grooves 22.

Each first inclined groove 21 extends, for example, so as to be inclined in a first direction (upward toward the right side in FIG. 2) relative to the tire axial direction. Each first inclined groove 21 of the present embodiment extends from the first circumferential edge 11a to the second circumferential edge 11b and traverses the first land portion 11. The first inclined groove 21 is inclined, for example, at an angle θ1 of 10 to 60° relative to the tire axial direction. The angle of the first inclined groove 21 relative to the tire axial direction preferably gradually increases toward the second circumferential edge 11b side, for example. Each first inclined groove 21 of the present embodiment is curved in an arc shape with a radius of curvature of 50 to 150 mm, for example. Such a first inclined groove 21 can provide frictional force in multiple directions during running on snow.

Figure 3:
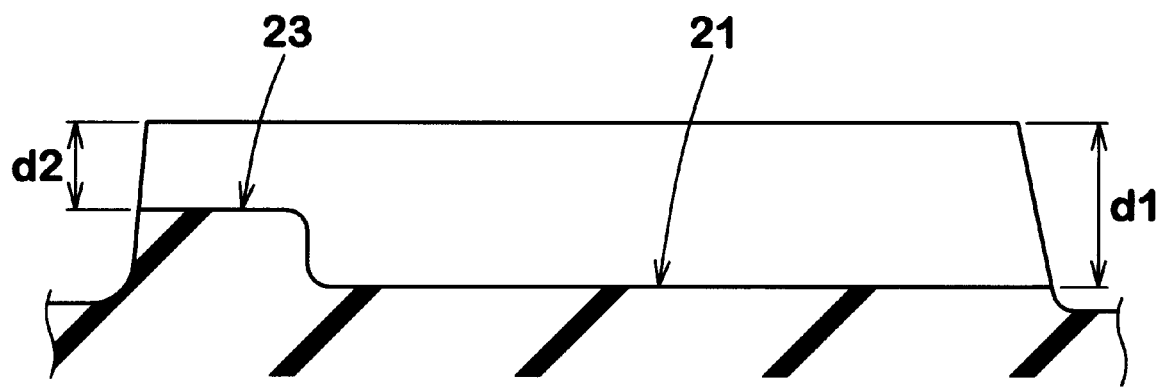
FIG. 3 is a cross-sectional view taken along a line A-A in FIG. 2.

FIG. 3 shows a cross-sectional view of the first inclined groove 21 taken along a line A-A in FIG. 2. As shown in FIG. 3, the first inclined groove 21 includes a first tie bar 23 raised at a groove bottom on the first circumferential edge 11a (shown in FIG. 2, and the same applies below) side. The first tie bar 23 of the present embodiment is provided, for example, in an end portion on the first circumferential edge 11a side of the first inclined groove 21. The first tie bar 23 has, for example, a constant depth in the longitudinal direction of the first inclined groove 21. The depth d2 of the first tie bar 23 is 45% to 60% of the maximum depth d1 of the first inclined groove 21. The first inclined groove 21 including such a first tie bar 23 can enhance on-snow performance while inhibiting a reduction in the stiffness of the first land portion 11.

As shown in FIG. 2, each second inclined groove 22 is, for example, inclined from the second circumferential edge 11b in a second direction (downward toward the right side in FIG. 2) opposite to the first direction and terminates within the first land portion 11. The second inclined groove 22 is inclined, for example, at an angle θ2 of 10 to 60° relative to the tire axial direction. The angle of the second inclined groove 22 relative to the tire axial direction preferably gradually increases toward the first circumferential edge 11a side, for example. Each second inclined groove 22 of the present embodiment is curved in an arc shape with a radius of curvature of 50 to 150 mm, for example.

The second inclined groove 22 communicates with the first inclined groove 21, for example, and preferably intersects the first inclined groove 21. Each second inclined groove 22 of the present embodiment intersects the first inclined groove 21 on the first circumferential edge 11a side with respect to a center position 20 in the tire axial direction of the first land portion 11. In a more preferable mode, the second inclined groove 22 intersects the first inclined groove 21 on the second circumferential edge 11b side with respect to the first tie bar 23 (shown in FIG. 3) of the first inclined groove 21. Such a second inclined groove 22 can form a hard snow column at the intersection with the first inclined groove 21 and provide large snow column shearing force during running on snow.

Figure 4:
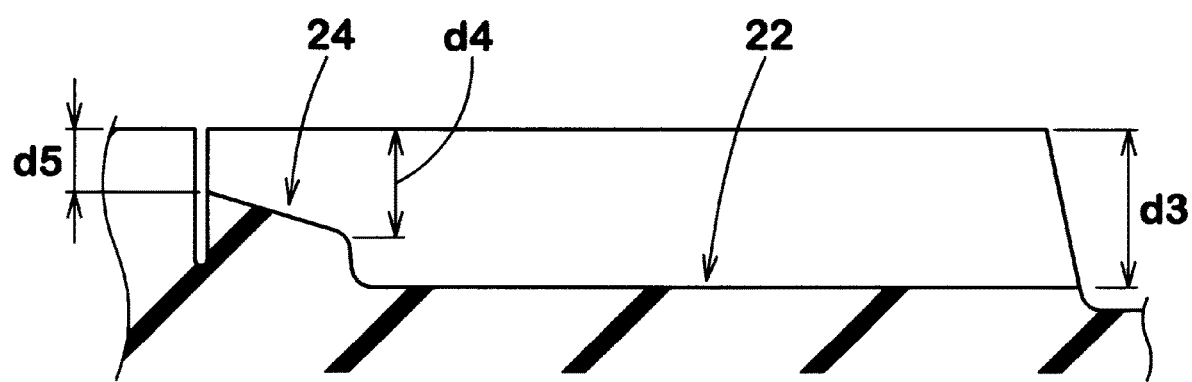
FIG. 4 is a cross-sectional view taken along a line B-B in FIG. 2.

FIG. 4 shows a cross-sectional view of the second inclined groove 22 taken along a line B-B in FIG. 2. As shown in FIG. 4, the second inclined groove 22 includes a second tie bar 24 raised at a groove bottom in an end portion at the first circumferential edge 11a. The second tie bar 24 of the present embodiment has, for example, an inclined bottom surface, and the depth thereof gradually decreases toward the first circumferential edge 11a side. The maximum depth d4 of the second tie bar 24 is 60% to 75% of the maximum depth d3 of the second inclined groove 22, and is preferably larger than the depth d2 (shown in FIG. 3) of the first tie bar 23. The minimum depth d5 of the second tie bar 24 is 35% to 45% of the maximum depth d3 of the second inclined groove 22, and is preferably smaller than the depth d2 of the first tie bar 23. The second inclined groove 22 including such a second tie bar 24 serves to enhance steering stability on a dry road surface and on-snow performance in a well-balanced manner.

As shown in FIG. 2, each curved groove 15 intersects a curved groove 15 adjacent thereto in the tire circumferential direction. Each curved groove 15 of the present embodiment extends from the first end 15a and intersects the second inclined groove 22. In addition, the curved groove 15 extends from the second inclined groove 22 toward the second end 15b side and intersects the first inclined groove 21 that intersects the second inclined groove 22. Moreover, the curved groove 15 extends from the first inclined groove 21 toward the second end 15b side and intersects the curved groove 15 adjacent thereto in the tire circumferential direction. Furthermore, the second end 15b of the curved groove 15 is located between the first circumferential edge 11a and the center position 20 in the tire axial direction of the first land portion 11. In a preferable mode, the second end 15b of the curved groove 15 is located on the second circumferential edge 11b side with respect to the terminal end of the second inclined groove 22.

The groove width of the curved groove 15 preferably gradually decreases from the first end 15a toward the second end 15b. The groove width of the curved groove 15 is, for example, 2 to 5 mm.

Figure 5:
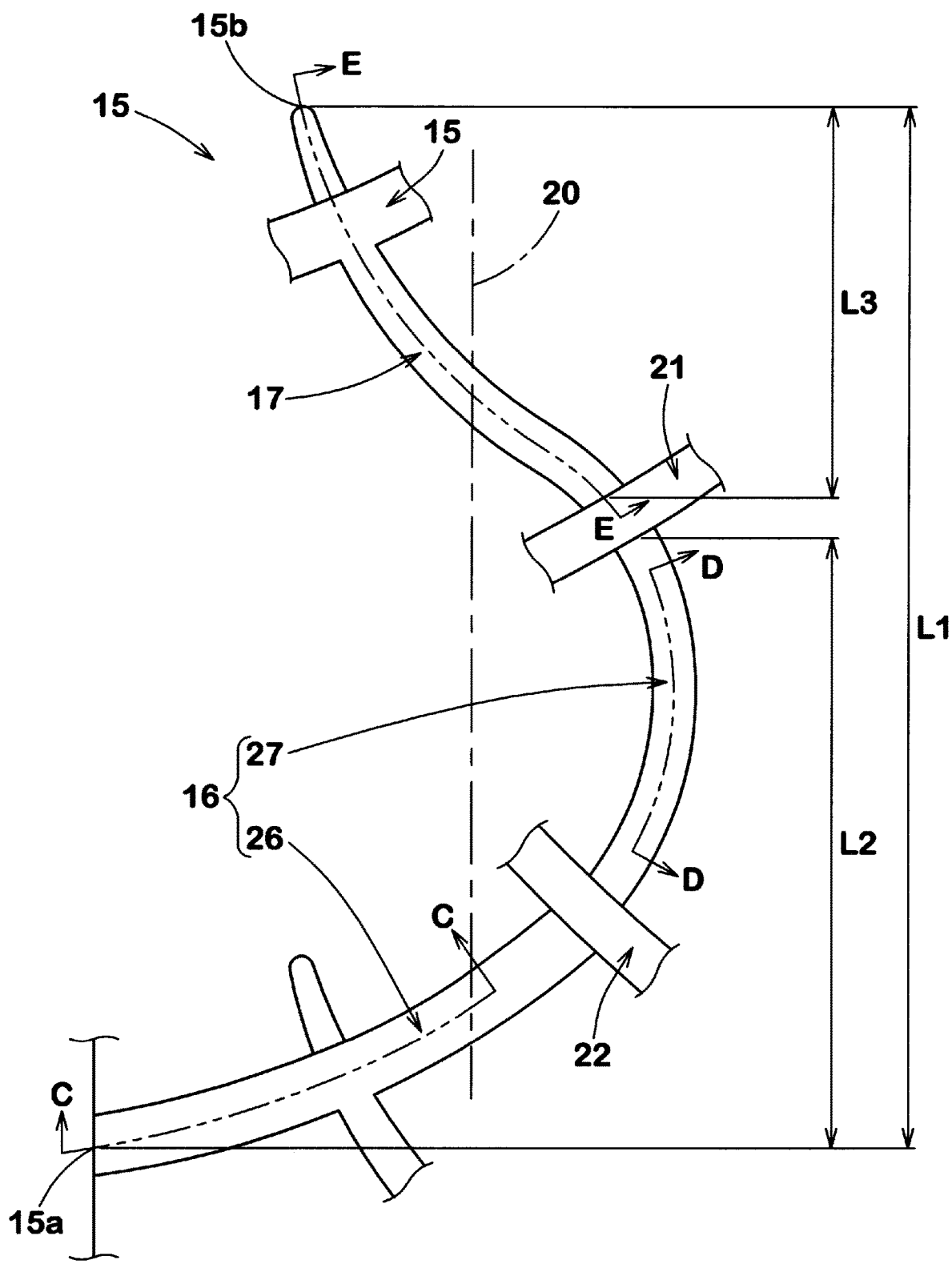
FIG. 5 is an enlarged view of the contour of a curved groove.

FIG. 5 shows an enlarged view of the contour of the curved groove 15. In FIG. 5, for ease of understanding the configuration of the curved groove 15, other grooves are omitted except portions that intersect the curved groove 15. As shown in FIG. 5, the first curved portion 16 of the curved groove 15 crosses the center position 20 in the tire axial direction of the first land portion 11, for example. The first curved portion 16 is, for example, formed between the first end 15a and the first inclined groove 21 and intersects the second inclined groove 22. The radius of curvature of the first curved portion 16 is, for example, 10 to 30 mm.

The first curved portion 16 includes a first portion 26 extending from the first end 15a to the second inclined groove 22, and a second portion 27 extending from the second inclined groove 22 to the first inclined groove 21. Each of the first portion 26 and the second portion 27 is curved. The first portion 26 extends, for example, so as to be inclined in the first direction, and extends along the first inclined groove 21 in the present embodiment. The second portion 27 is curved, for example, so as to be convex on the second circumferential edge 11b side.

The groove width of the second portion 27 is, for example, 2 to 5 mm. The second portion 27 is curved, for example, with a radius of curvature of 15 to 30 mm. The radius of curvature of the second portion 27 is preferably smaller than the radius of curvature of the first portion 26. The curved groove 15 including such a second portion 27 serves to further enhance on-snow performance.

The length L2 in the tire circumferential direction of the first curved portion 16 is preferably not less than 30% and more preferably not less than 40%, and is preferably not greater than 70% and more preferably not greater than 60%, of the length L1 in the tire circumferential direction of the curved groove 15. Each length of the curved groove 15 is, for example, measured along the groove center line.

Figure 6:
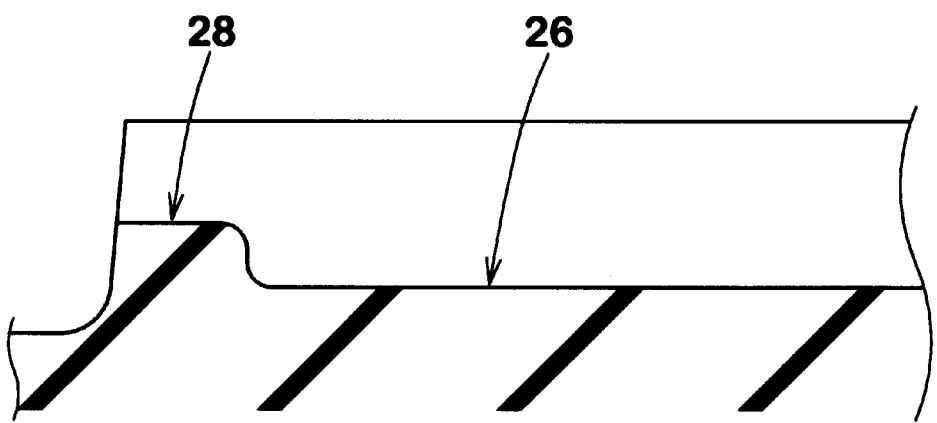
FIG. 6 is a cross-sectional view taken along a line C-C in FIG. 5.

FIG. 6 shows a cross-sectional view of the first portion 26 taken along a line C-C in FIG. 5. As shown in FIG. 6, the first portion 26 is, for example, preferably provided with a third tie bar 28 raised at a groove bottom on the first end 15a side of the curved groove 15. The configuration of the first tie bar 23 of the first inclined groove 21 can be applied to the third tie bar 28 of the first portion 26. Such a first portion 26 can enhance on-snow performance while maintaining steering stability on a dry road surface.

Figure 7:
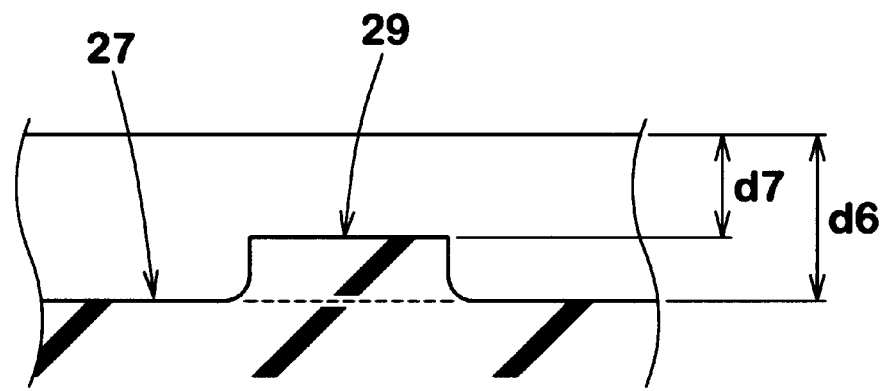
FIG. 7 is a cross-sectional view taken along a line D-D in FIG. 5.

FIG. 7 shows a cross-sectional view of the second portion 27 taken along a line D-D in FIG. 5. As shown in FIG. 7, the second portion 27 is provided with a fourth tie bar 29 raised at a groove bottom in a center portion in the longitudinal direction thereof. The depth d7 of the fourth tie bar 29 is 50% to 70% of the maximum depth d6 of the second portion 27.

Figure 8:
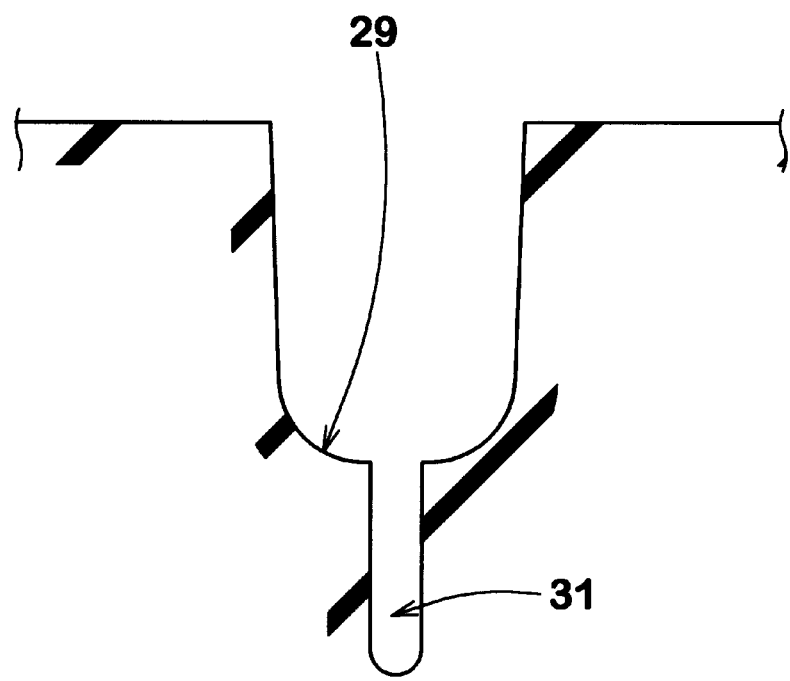
FIG. 8 is a transverse cross-sectional view of a fourth tie bar in FIG. 7.

FIG. 8 shows a cross-sectional view, of the fourth tie bar 29, orthogonal to the longitudinal direction of the second portion 27. As shown in FIG. 8, the fourth tie bar 29 preferably has a groove bottom sipe 31 that is open at the groove bottom and that extends in the longitudinal direction of the second portion 27. Such a groove bottom sipe 31 can inhibit clogging of the second portion 27 with snow. In the present specification, the term "sipe" means a slit having a width not greater than 1.5 mm.

As shown in FIG. 5, the second curved portion 17 of the curved groove 15 extends, for example, so as to be inclined in the second direction, and extends along the second inclined groove 22 in the present embodiment. The second curved portion 17 crosses the center position 20 in the tire axial direction of the first land portion 11, for example. The second curved portion 17 is, for example, formed between the first inclined groove 21 and the second end 15b and intersects the curved groove 15 adjacent thereto in the tire circumferential direction.

The radius of curvature of the second curved portion 17 is preferably larger than the radius of curvature of the first curved portion 16. The radius of curvature of the second curved portion 17 is, for example, 30 to 60 mm. Accordingly, the curved groove 15 is less likely to be clogged with snow during running on snow, and excellent on-snow performance is continuously exhibited.

The length L3 in the tire circumferential direction of the second curved portion 17 is smaller than the length L2 in the tire circumferential direction of the first curved portion 16. The length L3 of the second curved portion 17 is preferably not less than 20% and more preferably not less than 30%, and is preferably not greater than 50% and more preferably not greater than 40%, of the length L1 in the tire circumferential direction of the curved groove 15.

Figure 9:
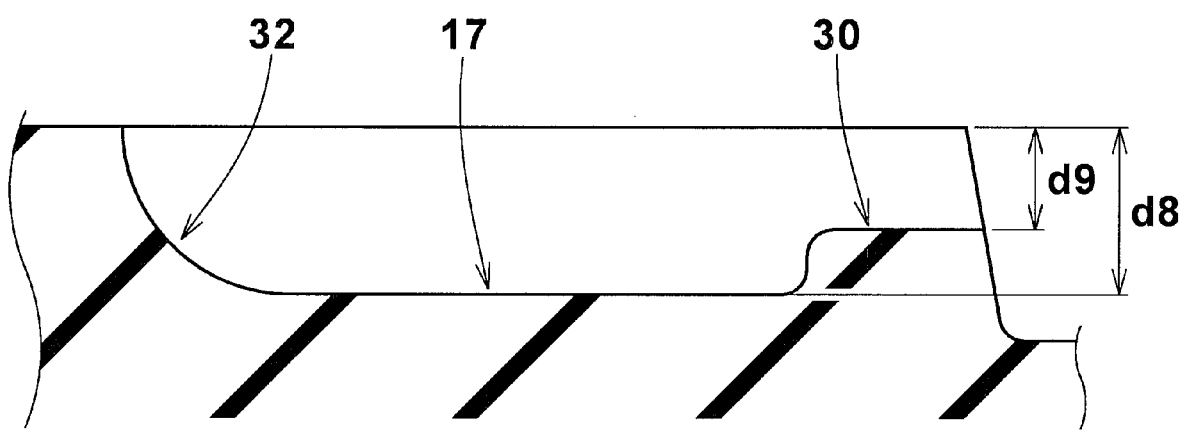
FIG. 9 is a cross-sectional view taken along a line E-E in FIG. 5.

FIG. 9 shows a cross-sectional view of the second curved portion 17 taken along a line E-E in FIG. 5. As shown in FIG. 9, the second curved portion 17 is, for example, provided with a fifth tie bar 30 raised at a groove bottom in an end portion on the first inclined groove 21 side. The depth d9 of the fifth tie bar 30 is, for example, 50% to 70% of the maximum depth d8 of the second curved portion 17. The second curved portion 17 having such a fifth tie bar 30 serves to enhance steering stability on a dry road surface and on-snow performance in a well-balanced manner.

An end portion 32 on the second end 15b side of the second curved portion 17 of the present embodiment has a depth that gradually decreases toward the second end 15b side. Accordingly, the end portion 32 has a bottom surface curved in an arc shape. Therefore, uneven wear is inhibited around the end portion 32.

As shown in FIG. 2, the first land portion 11 is divided into a plurality of blocks by providing the above-described first inclined grooves 21, second inclined grooves 22, and curved grooves 15 thereon. The first land portion 11 of the present embodiment includes a plurality of block elements 33 each demarcated between two first inclined grooves 21.

Each block element 33 includes, for example, a quadrangular block 34 having a substantially quadrangular tread surface, and a triangular block 35 having a substantially triangular tread surface. The quadrangular block 34 includes a part of the first circumferential edge 11a and is demarcated by two first inclined grooves 21 and a second inclined groove 22. The triangular block 35 is demarcated by a first inclined groove 21, a second inclined groove 22, and the second circumferential edge 11b. The triangular block 35 is, for example, located on the tire equator C. In the present embodiment, the triangular block 35 is also located on the center position 20 in the tire axial direction of the first land portion 11. In the triangular block 35, 50% or more of the area of the tread surface thereof is preferably located on the second tread edge Te2 side with respect to the center position 20.

The quadrangular block 34 has, for example, a plurality of sipes 40 inclined in the first direction. Each sipe 40 extends, for example, along the first inclined groove 21. The sipes 40 provided on the quadrangular block 34 include, for example, a first sipe 41, a second sipe 42, and a third sipe 43. The first sipe 41 extends from the first circumferential edge 11a to the second inclined groove 22. The second sipe 42 extends from the first circumferential edge 11a to the second curved portion 17 of the curved groove 15. The third sipe 43 extends from the second curved portion 17 to the second inclined groove 22. Each of such sipes 40 can provide frictional force during running on snow while inhibiting uneven wear of the first land portion 11.

Figure 10:
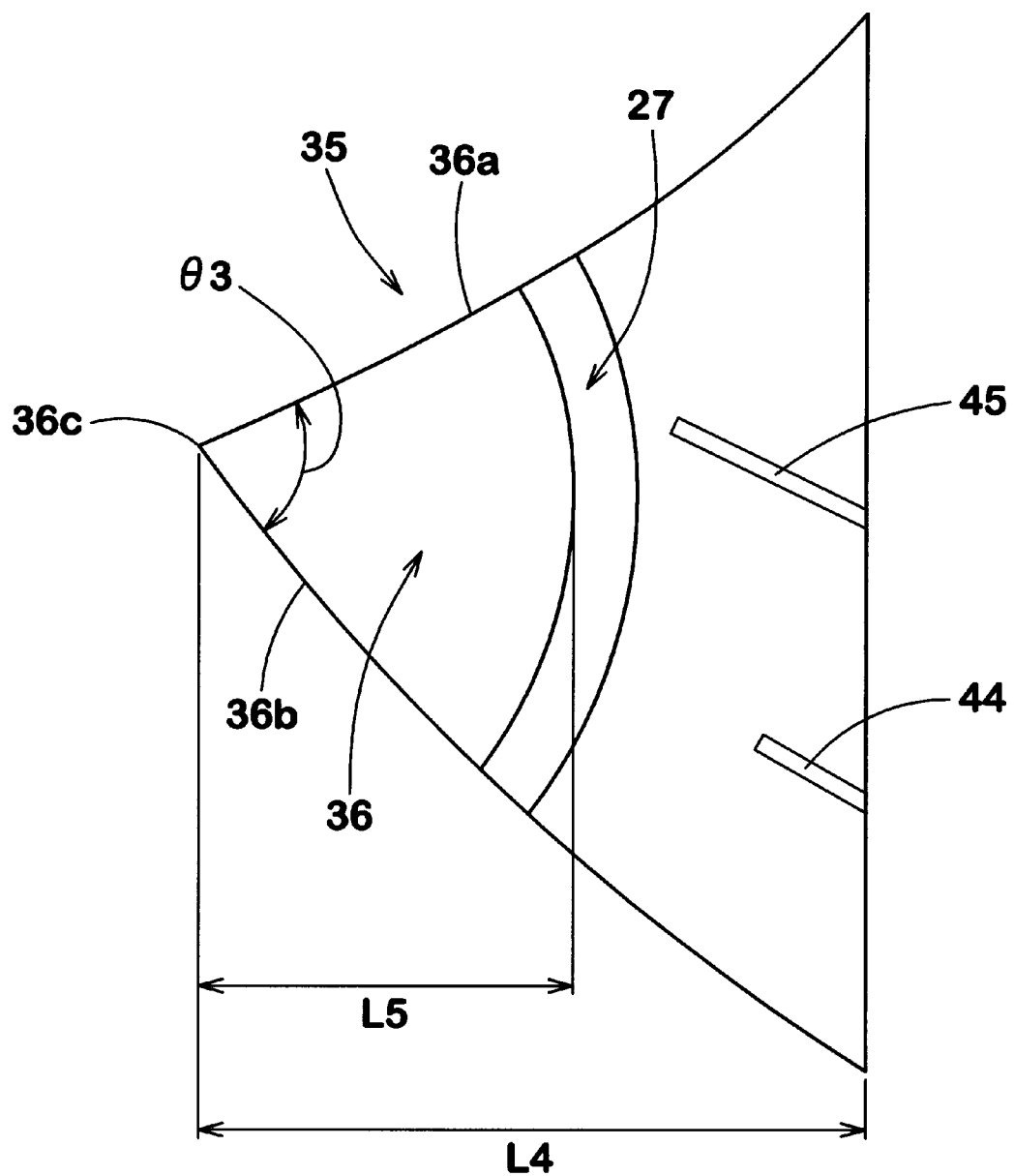
FIG. 10 is an enlarged view of a triangular block in FIG. 2.

FIG. 10 shows an enlarged view of the triangular block 35. The length L4 in the tire axial direction of the triangular block 35 is, for example, 0.50 to 0.80 times the width W1 (shown in FIG. 2) in the tire axial direction of the first land portion 11.

The second portion 27 of the first curved portion 16 of the curved groove 15 traverses the triangular block 35, for example. In a preferable mode, the curved groove 15 communicates with the first inclined groove 21 and the second inclined groove 22 on the second circumferential edge 11b side with respect to the center position 20 (shown in FIG. 2) in the tire axial direction of the first land portion 11 and traverses the triangular block 35. Accordingly, the triangular block 35 includes an end portion 36 demarcated by the first inclined groove 21, the second inclined groove 22, and the second portion 27. The length L5 in the tire axial direction of the end portion 36 is, for example, preferably not less than 30% and more preferably not less than 40%, and is preferably not greater than 70% and more preferably not greater than 60%, of the length L4 in the tire axial direction of the triangular block 35. Such a triangular block 35 can ensure stiffness in the tire axial direction and maintain steering stability on a dry road surface.

At the end portion 36, an angle θ3 between an edge 36a on the first inclined groove 21 side and an edge 36b on the second inclined groove 22 side is, for example, 40 to 80°. Such an end portion 36 can enhance wet performance while inhibiting chipping of the triangular block 35 during running. The angle θ3 corresponds to the angle between the tangent to the edge 36a at a top 36c of the end portion 36 and the tangent to the edge 36b at the top 36c.

The triangular block 35 preferably has a fourth sipe 44 and a fifth sipe 45 inclined in the second direction. The fourth sipe 44 and the fifth sipe 45 extend from the second circumferential edge 11b and terminate before reaching the second portion 27 of the first curved portion 16. The length in the tire axial direction of the fifth sipe 45 is larger than the length in the tire axial direction of the fourth sipe 44.

Figure 11:
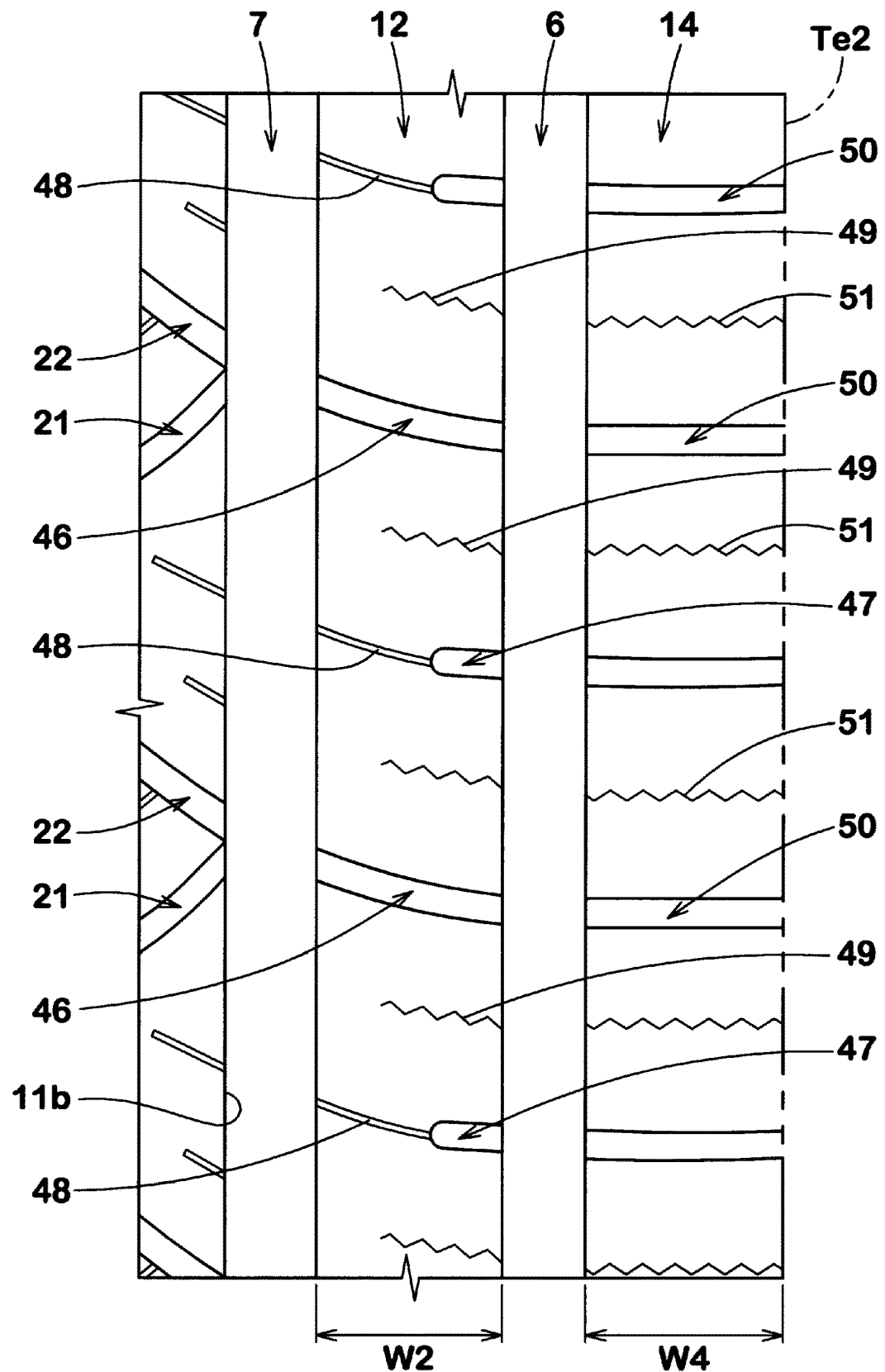
FIG. 11 is an enlarged view of a second land portion and a fourth land portion.

FIG. 11 shows an enlarged view of the second land portion 12 and the fourth land portion 14. As shown in FIG. 11, each of the width W2 in the tire axial direction of the second land portion 12 and the width W4 in the tire axial direction of the fourth land portion 14 is preferably 0.10 to 0.20 times the tread width TW.

The second land portion 12 has a plurality of first lateral grooves 46 and a plurality of termination grooves 47. Each first lateral groove 46 fully traverses the second land portion 12, for example. Each termination groove 47 extends from the second shoulder main groove 6 and terminates within the second land portion 12, for example. Such a first lateral groove 46 and such a termination groove 47 serve to enhance steering stability on a dry road surface and on-snow performance in a well-balanced manner.

In a preferable mode, an end portion on the crown main groove 7 side of the first lateral groove 46 preferably overlaps a region obtained by extending an end portion on the second circumferential edge 11b side of the first inclined groove 21 so as to be parallel to the tire axial direction. In addition, the first lateral groove 46 preferably overlaps a region obtained by extending the second inclined groove 22 while maintaining the inclination direction and the curvature thereof. Accordingly, during running on snow, the first lateral groove 46 forms a large snow column together with the first inclined groove 21 and the second inclined groove 22, so that on-snow performance is further enhanced.

The second land portion 12 of the present embodiment has connection sipes 48 that extend from the termination grooves 47 to the crown main groove 7, and termination sipes 49 that extend from the second shoulder main groove 6 and that terminate within the second land portion 12. Such connection sipes 48 and termination sipes 49 can provide frictional force during running on snow while inhibiting uneven wear of the second land portion 12.

The fourth land portion 14 has a plurality of second lateral grooves 50 and a plurality of first transverse sipes 51. Each of the second lateral grooves 50 and the first transverse sipes 51 traverses the fourth land portion 14.

An end portion on the second shoulder main groove 6 side of each second lateral groove 50 preferably overlaps a region obtained by extending an end portion on the second shoulder main groove 6 side of the first lateral groove 46 or the termination groove 47, which is provided on the third land portion 13, so as to be parallel to the tire axial direction. Accordingly, the second lateral groove 50 and the first lateral groove 46 or the termination groove 47 become integrated to form a large snow column during running on snow, so that excellent on-snow performance is exhibited.

Figure 12:
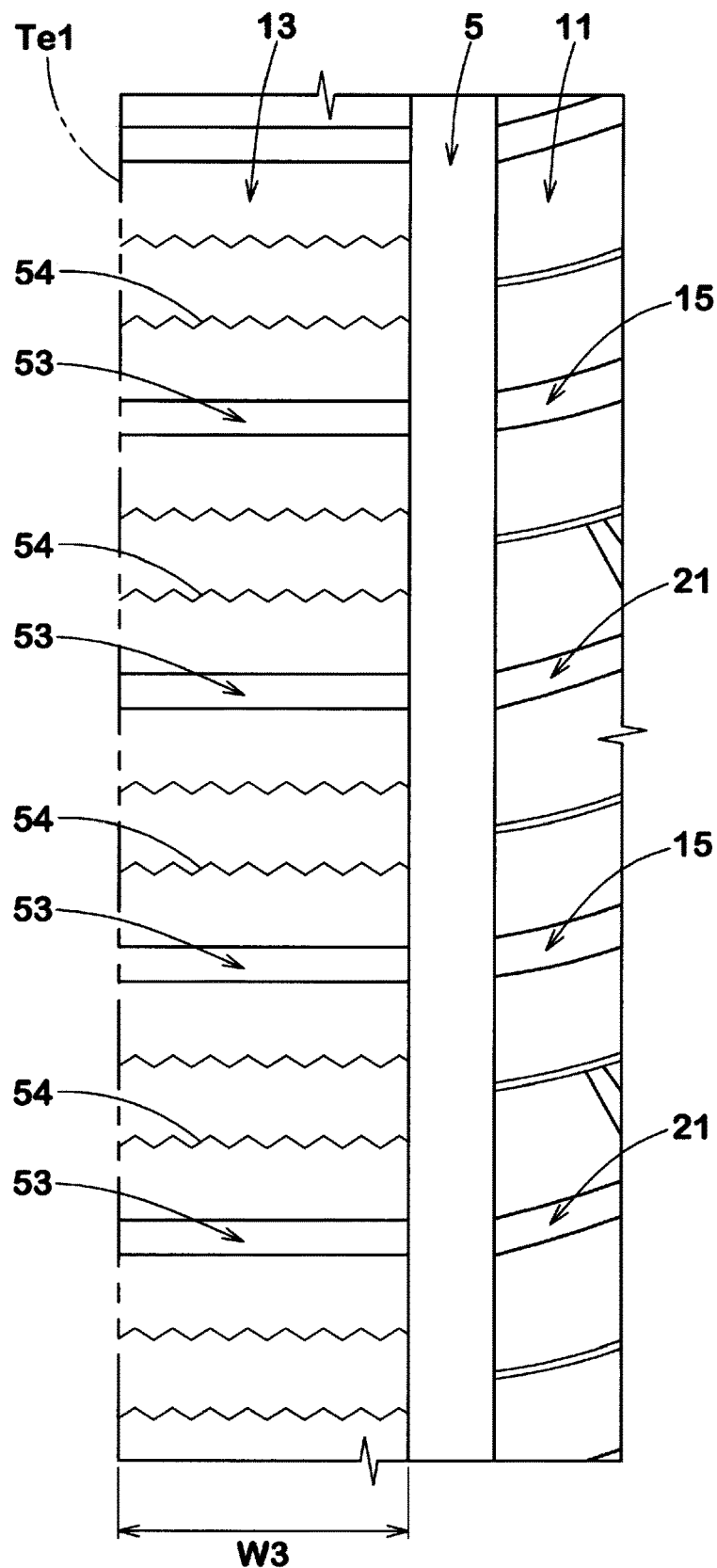
FIG. 12 is an enlarged view of a third land portion.

FIG. 12 shows an enlarged view of the third land portion 13. As shown in FIG. 12, the width W3 in the tire axial direction of the third land portion 13 is, for example, 0.10 to 0.25 times of the tread width TW. In a preferable mode, the width W3 of the third land portion 13 is larger than the width W2 (shown in FIG. 11) in the tire axial direction of the second land portion 12 and the width W4 (shown in FIG. 11) in the tire axial direction of the fourth land portion 14.

The third land portion 13 has a plurality of third lateral grooves 53 and a plurality of second transverse sipes 54. Each of the third lateral grooves 53 and the second transverse sipes 54 traverses the third land portion 13.

An end portion on the first shoulder main groove 5 side of each third lateral groove 53 preferably overlaps a region obtained by extending an end portion on the first shoulder main groove 5 side of the first inclined groove 21 or the curved groove 15, which is provided on the first land portion 11, so as to be parallel to the tire axial direction. Accordingly, the third lateral groove 53 and the first inclined groove 21 or the curved groove 15 become integrated to form a large snow column during running on snow, so that excellent on-snow performance is exhibited.

Although the tire according to the embodiment of the present invention has been described in detail above, the present invention is not limited to the above specific embodiment, and various modifications can be made to implement the present invention.

EXAMPLES

Tires with a size of 215/60R16 having the basic pattern in FIG. 1 were produced as test tires. As a comparative example, a tire having first land portions a shown in FIG. 13 was produced as a test tire. In the tire of the comparative example, a first curved portion c and a second curved portion d of each curved groove b are each formed by an arc curve with a radius of curvature having a center on the first circumferential edge side. The tire of the comparative example has substantially the same pattern as shown in FIG. 1, except for the above matters. The respective test tires were tested for steering stability on a dry road surface and on-snow performance. The common specifications and the test methods for the respective test tires are as follows.

Mount rim: 16×6.5
Tire internal pressure: 240 kPa
Test vehicle: a front-wheel-drive car having an engine displacement of 2500 cc
Tire mounted position: all wheels
<Steering Stability on Dry Road Surface>
Sensory evaluation was made by a driver for steering stability when the driver drove the above test vehicle on a dry road surface. The results are indicated as scores with the score of the comparative example being regarded as 100. A higher value indicates that the steering stability on a dry road surface is better. As for the scores, 95 points or more is acceptable, and 98 points or more is more preferable.
<On-Snow Performance>
Sensory evaluation was made by a driver for performance when the driver drove the above test vehicle on a snow road.

The results are indicated as scores with the score of the comparative example being regarded as 100. A higher value indicates that the on-snow performance is better. As for the scores, 95 points or more is acceptable, and 98 points or more is more preferable.

The test results are shown in Table 1.

TABLE 1

Figure 13:
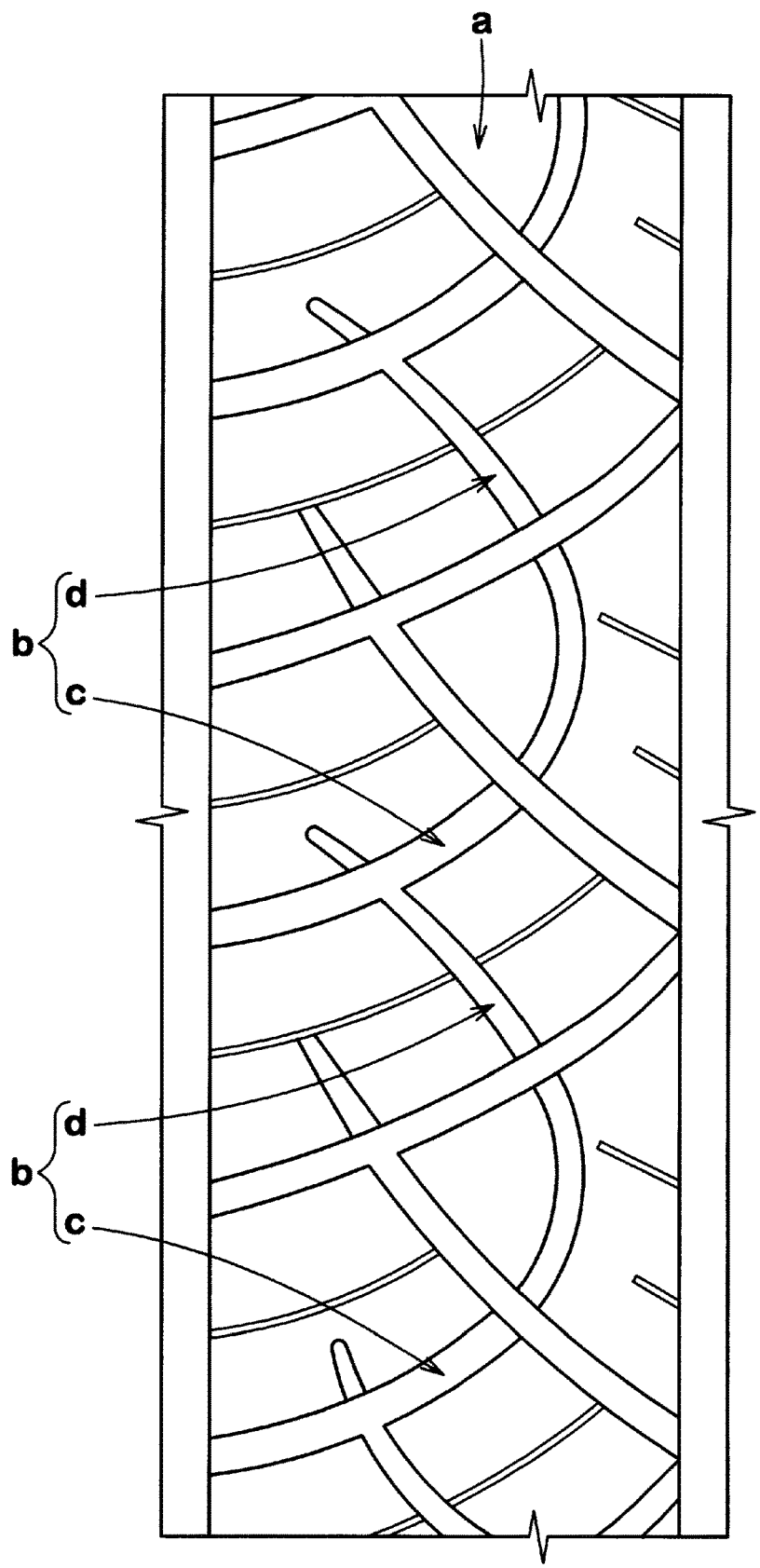
FIG. 13 is an enlarged view of a first land portion of a tire of a comparative example.

| | Comparative Example | Example 1 | Example 2 | Example 3 | Example 4 | Example 5 | Example 6 | Example 7 | Example 8 | Example 9 |
|---|---|---|---|---|---|---|---|---|---|---|
| Drawing showing first land portion | FIG. 13 | FIG. 2 | FIG. 2 | FIG. 2 | FIG. 2 | FIG. 2 | FIG. 2 | FIG. 2 | FIG. 2 | FIG. 2 |
| Radius of curvature (mm) of first curved portion | — | 20 | 10 | 15 | 25 | 30 | 20 | 20 | 20 | 20 |
| Radius of curvature (mm) of second curved portion | — | 45 | 30 | 30 | 50 | 60 | 45 | 45 | 45 | 45 |
| Length L2 of first curved portion/length L1 of curved groove (%) | — | 60 | 60 | 60 | 60 | 60 | 30 | 40 | 50 | 70 |
| Steering stability on dry road surface (score) | 100 | 100 | 99 | 100 | 100 | 101 | 99 | 100 | 100 | 99 |
| On-snow performance (score) | 100 | 105 | 106 | 105 | 104 | 103 | 103 | 104 | 105 | 104 |

As a result of the tests, it was confirmed that the tire of each Example exhibits excellent on-snow performance while maintaining steering stability on a dry road surface in a preferable range, and the overall performance of the tire is improved.

What is claimed is:

1. A tire having a tread portion, wherein
the tread portion includes a first land portion,
the first land portion includes a first circumferential edge, a second circumferential edge, and a tread surface between the first circumferential edge and the second circumferential edge,
on the first land portion, a plurality of curved grooves are provided in a tire circumferential direction,
each of the curved grooves extends from a first end on the first circumferential edge side and terminates at a second end within the first land portion,
each of the curved grooves includes a first curved portion on the first end side, and a second curved portion on the second end side,
the first curved portion is an arc curve with a radius of curvature having a center on the first circumferential edge side of the curved groove,
the second curved portion is an arc curve with a radius of curvature having a center on the second circumferential edge side of the curved groove, and
the radius of curvature of the first curved portion is 10 to 30 mm.

2. The tire according to claim 1, wherein the radius of curvature of the second curved portion is 30 to 60 mm.

3. A tire having a tread portion, wherein
the tread portion includes a first land portion,
the first land portion includes a first circumferential edge, a second circumferential edge, and a tread surface between the first circumferential edge and the second circumferential edge,
on the first land portion, a plurality of curved grooves are provided in a tire circumferential direction,
each of the curved grooves extends from a first end on the first circumferential edge side and terminates at a second end within the first land portion,
each of the curved grooves includes a first curved portion on the first end side, and a second curved portion on the second end side,
the first curved portion is an arc curve with a radius of curvature having a center on the first circumferential edge side of the curved groove,
the second curved portion is an arc curve with a radius of curvature having a center on the second circumferential edge side of the curved groove, and
the first land portion comprises an inclined groove that is inclined from the second circumferential edge and crosses the first curved portion of the curved groove.

4. The tire according to claim 3, wherein
the first curved portion crosses a center position in a tire axial direction of the first land portion,
the second curved portion crosses a center position in a tire axial direction of the first land portion,
the second end is located between the first circumferential edge and a center position in a tire axial direction of the first land portion, and
the radius of curvature of the second curved portion is larger than the radius of curvature of the first curved portion.

5. A tire having a tread portion, wherein
the tread portion includes a first land portion,
the first land portion includes a first circumferential edge, a second circumferential edge, and a tread surface between the first circumferential edge and the second circumferential edge,
on the first land portion, a plurality of curved grooves are provided in a tire circumferential direction,
each of the curved grooves extends from a first end on the first circumferential edge side and terminates at a second end within the first land portion,
each of the curved grooves includes a first curved portion on the first end side, and a second curved portion on the second end side,
the first curved portion is an arc curve with a radius of curvature having a center on the first circumferential edge side of the curved groove,
the second curved portion is an arc curve with a radius of curvature having a center on the second circumferential edge side of the curved groove,
the tire has a designated mounting direction to a vehicle,
the tread portion includes a first tread edge located on an outer side of the vehicle when the tire is mounted on the vehicle, a second tread edge located on an inner side of the vehicle when the tire is mounted on the vehicle, a first shoulder main groove continuously extending in the tire circumferential direction between the first tread edge and a tire equator, and a crown main groove adjacent to the second tread edge side of the first shoulder main groove, and the first land portion is demarcated between the first shoulder main groove and the crown main groove, and further comprising a first sipe that extends from the first circumferential edge to a second inclined groove parallel to the first curved portion of the curved groove.

6. The tire according to claim 5, wherein the first curved portion crosses a center position in a tire axial direction of the first land portion.

7. The tire according to claim 5, wherein the second curved portion crosses a center position in a tire axial direction of the first land portion.

8. The tire according to claim 5, wherein the second end is located between the first circumferential edge and a center position in a tire axial direction of the first land portion.

9. The tire according to claim 5, wherein a groove width of each of the curved grooves gradually decreases from the first end toward the second end.

10. The tire according to claim 5, wherein a groove width of each of the curved grooves is 2 to 4 mm.

11. The tire according to claim 5, wherein the radius of curvature of the second curved portion is larger than the radius of curvature of the first curved portion.

12. The tire according to claim 5, wherein the radius of curvature of the first curved portion is 10 to 30 mm.

13. The tire according to claim 5, wherein the radius of curvature of the second curved portion is 30 to 60 mm.

14. The tire according to claim 5, wherein a length in the tire circumferential direction of the first curved portion is 30% to 70% of a length in the tire circumferential direction of the curved groove.

15. The tire according to claim 5, wherein the tread portion includes four land portions demarcated by main grooves continuous in the tire circumferential direction.

16. The tire according to claim 5, wherein the first land portion comprises an inclined groove that is inclined from the second circumferential edge and crosses the first curved portion of the curved groove.

17. The tire according to claim 5, further comprising a lateral groove that overlaps a region obtained by extending an end portion on a first shoulder main groove side of the curved groove.

18. The tire according to claim 5, wherein the first curved portion comprises a first portion and a second portion, the second portion provided with a tie bar raised at a groove bottom in a center portion in the longitudinal direction of the second portion.

19. The tire according to claim 5, further comprising a second sipe that extends from the first circumferential edge to the second curved portion of the curved groove.

* * * * *